United States Patent
Watanabe et al.

(10) Patent No.: US 10,935,113 B2
(45) Date of Patent: Mar. 2, 2021

(54) MULTI-STAGE PLANETARY ROLLER POWER TRANSMISSION DEVICE

(71) Applicant: JTEKT CORPORATION, Osaka (JP)

(72) Inventors: Hajime Watanabe, Kashiwara (JP); Yuichi Matsumoto, Nishimuro-gun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/906,375

(22) Filed: Jun. 19, 2020

(65) Prior Publication Data
US 2020/0400223 A1 Dec. 24, 2020

(30) Foreign Application Priority Data
Jun. 21, 2019 (JP) .............................. JP2019-115252

(51) Int. Cl.
| | |
|---|---|
| F16H 13/08 | (2006.01) |
| F16H 13/10 | (2006.01) |
| F16H 13/14 | (2006.01) |
| F16H 1/46 | (2006.01) |
| F16H 15/50 | (2006.01) |
| F16H 57/08 | (2006.01) |

(52) U.S. Cl.
CPC ........... *F16H 13/08* (2013.01); *F16H 57/082* (2013.01)

(58) Field of Classification Search
CPC ........ F16H 15/52; F16H 15/503; F16H 15/28; F16H 15/50; F16H 37/086; F16H 13/08; F16H 57/082; F16H 13/10; F16H 13/14; F16H 1/46; F16C 2240/46
See application file for complete search history.

(56) References Cited

U.S. PATENT DOCUMENTS

| | | | | |
|---|---|---|---|---|
| 4,302,988 A | * | 12/1981 | Takahashi | ............... F16H 13/06 192/20 |
| 8,845,472 B2 | * | 9/2014 | Matsuda | ............. F16H 57/0464 475/159 |
| 9,316,303 B2 | * | 4/2016 | Watanabe | ............. F16C 25/083 |
| 10,087,985 B2 | * | 10/2018 | Inoue | .................. F16C 33/6633 |

FOREIGN PATENT DOCUMENTS

JP 2002-257205 A 9/2002

* cited by examiner

*Primary Examiner* — Tisha D Lewis
(74) *Attorney, Agent, or Firm* — Oliff PLC (57) ABSTRACT

A multi-stage planetary roller power transmission device includes a high-speed power transmission mechanism including a first sun shaft, a first fixed ring, first planetary rollers disposed between the first sun shaft and the first fixed ring with a first negative clearance, first support shafts, and an annular first carrier into which the first support shafts are press-fitted; and a low-speed power transmission mechanism including a second sun shaft, a second fixed ring, second planetary rollers disposed between the second sun shaft and the second fixed ring with a second negative clearance, second support shafts, and an annular second carrier into which the second support shafts are press-fitted. A clearance amount of the first negative clearance and a clearance amount of the second negative clearance are equal to each other, and the number of the first planetary rollers is smaller than the number of the second planetary rollers.

2 Claims, 4 Drawing Sheets

MULTI-STAGE PLANETARY ROLLER POWER TRANSMISSION DEVICE

CROSS-REFERENCE TO RELATED APPLICATION

This application claims priority to Japanese Patent Application No. 2019-115252 filed on Jun. 21, 2019, incorporated herein by reference in its entirety.

BACKGROUND

1. Technical Field

The disclosure relates to a multi-stage planetary roller power transmission device.

2. Description of Related Art

Figure 4:
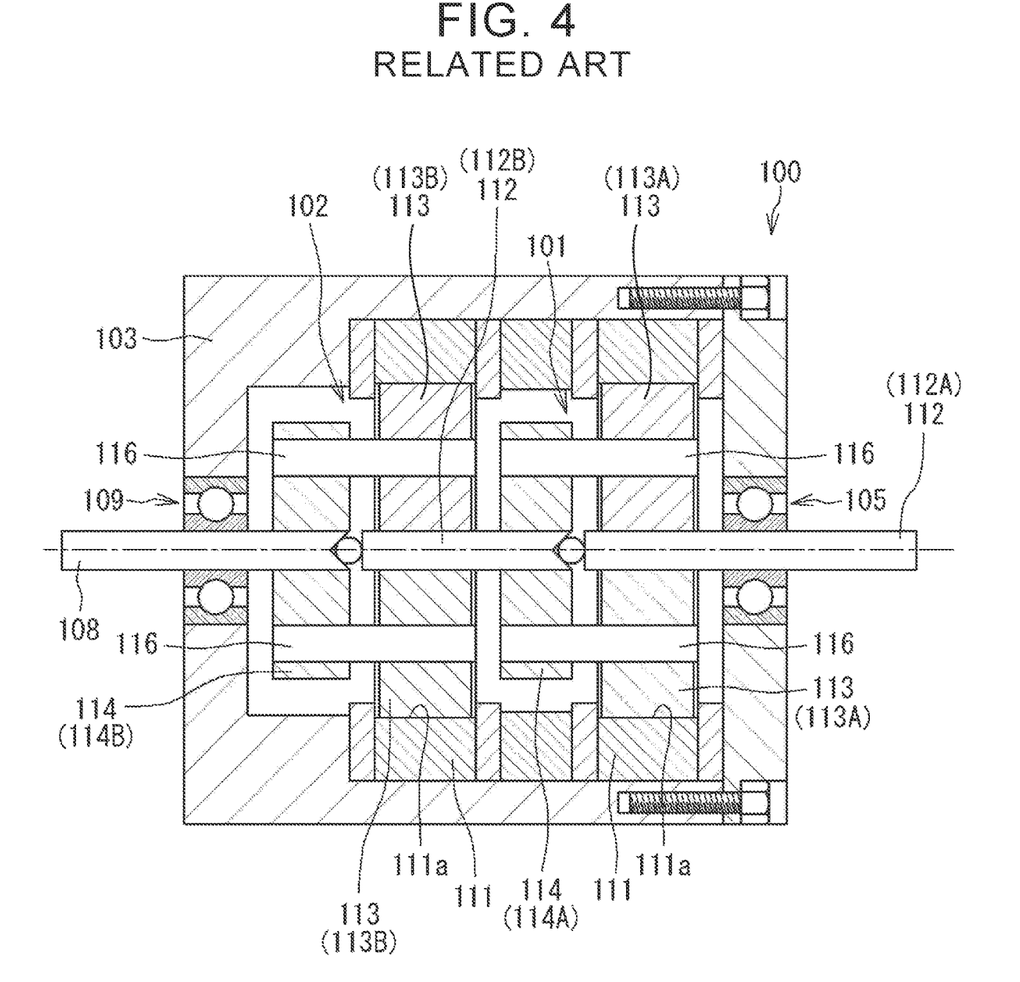
FIG. 4 is a sectional view of a two-stage planetary roller power transmission device according to the related art.

In the field of machine tools and industrial machines, a multi-stage planetary roller power transmission device is used as a speed reducer capable of transmitting power with low noise and low vibration (see Japanese Unexamined Patent Application Publication No. 2002-257205 (JP 2002-257205 A)). For example, as shown in FIG. 4, a two-stage planetary roller power transmission device 100 includes a high-speed power transmission mechanism 101 and a low-speed power transmission mechanism 102. These power transmission mechanisms 101, 102 have the same configuration, and each include a fixed ring 111, a sun shaft 112, a plurality of planetary rollers 113, and a carrier 114.

The fixed ring 111 is fixed to an inner peripheral surface of a housing 103, and the planetary rollers 113 are disposed on an inner peripheral surface 111a of the fixed ring 111. Each of the planetary rollers 113 is supported on a support shaft 116 fixed to the carrier 114 so as to be rotatable with respect to the support shaft 116. The sun shaft 112 is disposed at the center of the planetary rollers 113 so as to be in contact with the outer peripheral surfaces of the planetary rollers 113.

A sun shaft 112A of the high-speed power transmission mechanism 101 is supported by the housing 103 via a rolling bearing 105 so as to be rotatable. A first end of a sun shaft 112B of the low-speed power transmission mechanism 102 is press-fitted into the center of a carrier 114A of the high-speed power transmission mechanism 101. A second end of the sun shaft 112B is disposed at the center of the planetary rollers 113B of the low-speed power transmission mechanism 102. An output shaft 108 is press-fitted into the center of the carrier 114B, and the output shaft 108 is supported by the housing 103 via a rolling bearing 109 so as to be rotatable.

In each of the power transmission mechanisms 101, 102, the planetary rollers 113 are fitted between the fixed ring 111 and the sun shaft 112 with a negative clearance, so that the planetary rollers 113 are in contact with the fixed ring 111 and the sun shaft 112 with a predetermined pressing force. Traction oil is applied to the contact surfaces. Rotational power of the sun shaft 112 is transmitted to each of the planetary rollers 113 by the shearing force of the traction oil, so that each of the planetary rollers 113 rotates about the support shaft 116 and the planetary rollers 113 revolve around the sun shaft 112 while rolling on the inner peripheral surface 111a of the fixed ring 111. Thus, the rotational power of the sun shaft 112A of the high-speed power transmission mechanism 101, which serves as an input shaft, is transmitted to the sun shaft 112B of the low-speed power transmission mechanism 102 via the carrier 114A, and the rotational power of the sun shaft 112B is transmitted to the output shaft 108 via the carrier 114B. The "negative clearance" is defined as follows. The "negative clearance" indicates that when a planetary roller is fitted between a fixed ring and a sun shaft with a central axis of the fixed ring coinciding with a central axis of the sun shaft, a value obtained by subtracting a diameter of the planetary roller before being fitted between the fixed ring and the sun shaft from a maximum length of the planetary roller in a radial direction with respect to the central axis of the sun shaft is smaller than zero (0), on the assumption that the fixed ring is not deformed and the sun shaft is not deformed.

SUMMARY

Since the high-speed power transmission mechanism 101 and the low-speed power transmission mechanism 102 have the same configuration, the clearance amount of the negative clearance at a time when the planetary rollers 113A are fitted in the high-speed power transmission mechanism 101 is equal to the clearance amount of the negative clearance at a time when the planetary rollers 113B are fitted in the low-speed power transmission mechanism 102. Thus, the planetary rollers 113A and the planetary rollers 113B are in contact with the respective sun shafts 112 and the respective fixed rings 111 with the same pressing force. However, since the rotation speed of the sun shaft 112A and the planetary rollers 113A is higher than that of the sun shaft 112B and the planetary rollers 113B, the high-speed power transmission mechanism 101 generates more heat than the low-speed power transmission mechanism 102 even with the same pressing force. This shortens the life of the high-speed power transmission mechanism 101 as compared with the life of the low-speed power transmission mechanism 102.

In view of the above, it can be considered that the clearance amount of the negative clearance at the time when the planetary rollers 113A are fitted may be made smaller than the clearance amount of the negative clearance at the time when the planetary rollers 113B are fitted so that the pressing force of the planetary rollers 113A is smaller than that of the planetary rollers 113B. However, in this case, the components (the fixed ring 111, the sun shaft 112, and the planetary rollers 113) need to be selected and matched with each other based on their dimensions to be fitted in each of the high-speed power transmission mechanism 101 and the low-speed power transmission mechanism 102 with the corresponding clearance amount. It is therefore necessary to produce and fit a plurality of kinds of components with different dimensions.

The disclosure provides a multi-stage planetary roller power transmission device that makes it possible to increase the life of components while restraining an increase in the number of kinds of components.

An aspect of the disclosure relates to a multi-stage planetary roller power transmission device. The multi-stage planetary roller power transmission device includes a high-speed power transmission mechanism including a first sun shaft rotatable about an axis thereof, a first fixed ring disposed radially outward of the first sun shaft so as to be concentric with the first sun shaft, a plurality of first planetary rollers disposed between the first sun shaft and the first fixed ring with a first negative clearance, a plurality of first support shafts configured to respectively support the first planetary rollers such that the first planetary rollers are rotatable, and a first carrier into which the first support shafts are press-fitted, the first carrier being configured to rotate in conjunction with revolution of the first planetary rollers, and the first carrier having an annular shape; and a low-speed power transmission mechanism including a second sun shaft rotatable about an axis thereof at a lower speed than a speed at which the first sun shaft rotates, a second fixed ring disposed radially outward of the second sun shaft so as to be concentric with the second sun shaft, a plurality of second planetary rollers disposed between the second sun shaft and the second fixed ring with a second negative clearance, a plurality of second support shafts configured to respectively support the second planetary rollers such that the second planetary rollers are rotatable, and a second carrier into which the second support shafts are press-fitted, the second carrier being configured to rotate in conjunction with revolution of the second planetary rollers, and the second carrier having an annular shape. A clearance amount of the first negative clearance and a clearance amount of the second negative clearance are equal to each other, and the number of the first planetary rollers is smaller than the number of the second planetary rollers.

According to the above aspect of the disclosure, the clearance amount of the first negative clearance is equal to the clearance amount of the second negative clearance. Thus, identical components (i.e., the same components) can be used as the first fixed ring of the high-speed power transmission mechanism and the second fixed ring of the low-speed power transmission mechanism, and identical components can be used as the first planetary rollers of the high-speed power transmission mechanism and the second planetary rollers of the low-speed power transmission mechanism. Accordingly, it is possible to restrain an increase in the number of kinds of components. Further, the clearance amounts are equal to each other and the number of the first planetary rollers is smaller than the number of the second planetary rollers. Thus, the pressing force of the first planetary rollers against the first sun shaft that rotates at a highs speed and the first fixed ring is smaller than the pressing force of the second planetary rollers against the second sun shaft that rotates at a low speed and the second fixed ring. The life of the high-speed power transmission mechanism can therefore be increased, and thus, the life of the entire device can be increased.

The first carrier and the second carrier may be identical members; and each of the identical members may have a plurality of holes into which the first support shafts arranged at equal intervals in a circumferential direction are allowed to be press-fitted, and into which the second support shafts arranged at equal intervals in the circumferential direction are allowed to be press-fitted. Since the number of the first planetary rollers is smaller than the number of the second planetary rollers, the number of the first support shafts is also smaller than the number of the second support shafts. In the above configuration, the first carrier and the second carrier are identical members (i.e., members having the same structure), and each of the identical members is provided with the holes into which the different number of the first support shafts and the second support shafts can be press-fitted. The first support shafts are arranged at equal intervals in the circumferential direction, and the second support shafts are arranged at equal intervals in the circumferential direction. Thus, even when the number of the first support shafts is smaller than the number of the second support shafts, the identical members can be used as the first carrier and the second carrier, and thus an increase in the number of kinds of the components can be further restrained.

According to the above aspect of the disclosure, it is possible to increase the life of components while restraining an increase in the number of kinds of the components.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
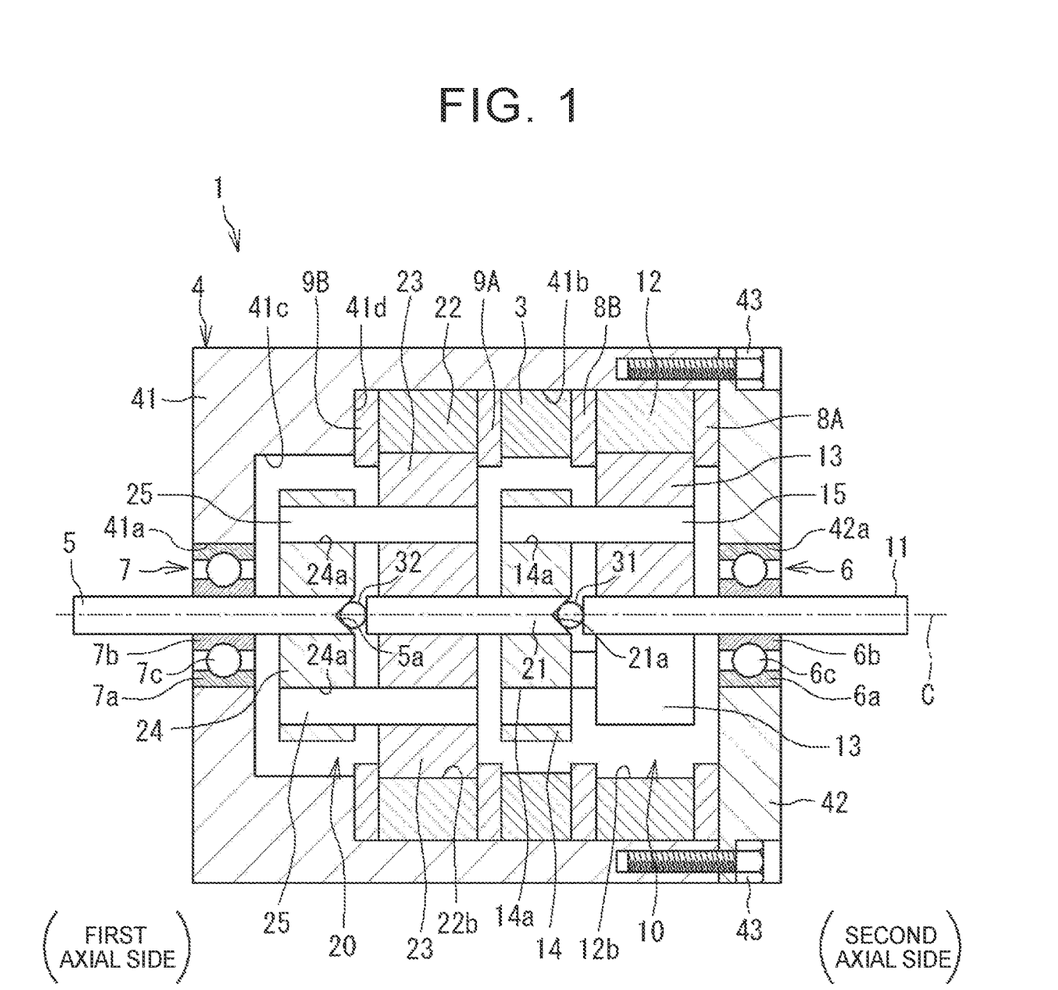
FIG. 1 is a sectional view of a multi-stage planetary roller power transmission device according to an embodiment of the disclosure.

FIG. 1 is a sectional view of a multi-stage planetary roller power transmission device according to an embodiment of the disclosure. A multi-stage planetary roller power transmission device 1 of the present embodiment is a traction-driven two-stage planetary roller power transmission device, and includes a housing 4, a power transmission shaft 5, a first stage power transmission mechanism 10, and a second stage power transmission mechanism 20. In this specification, one side in a longitudinal direction of the power transmission shaft 5 is referred to as "first axial side", and the other side is referred to as "second axial side".

The housing 4 is made of an aluminum alloy or the like, and includes a housing body 41 and a lid 42. The housing body 41 has a bottomed cylindrical shape, and is opened on the second axial side. A mounting hole 41a for mounting a rolling bearing 7 described later is provided in a bottom portion of the housing body 41 on the first axial side. The housing body 41 has on its inner periphery a large-diameter surface 41b, a small-diameter surface 41c provided on the first axial side relative to the large-diameter surface 41b (i.e., a small-diameter surface 41c provided closer to the first axial side than the large-diameter surface 41b is), and a step surface 41d extending in a radial direction at a boundary between the large-diameter surface 41b and the small-diameter surface 41c.

The lid 42 has a disk shape, and is provided on the second axial side of the housing body 41. An outer peripheral portion of the lid 42 is fixed to an end surface of the housing body 41 on the second axial side by bolts 43. A mounting hole 42a for mounting a rolling bearing 6 described later is provided at the center of the lid 42.

The configuration of the first-stage power transmission mechanism will be described. The first-stage power transmission mechanism 10 functions as a high-speed power transmission mechanism, and includes a first sun shaft 11, a first fixed ring 12, a plurality of first planetary rollers 13, and a first carrier 14. The first sun shaft 11 has a columnar shape, and is inserted into the mounting hole 42a of the lid 42. The first sun shaft 11 serves as an input shaft to which rotational power from a motor is input, and the end of the first sun shaft 11 on the second axial side is connected to an output shaft of the motor via a coupling or the like such that the first sun shaft 11 is rotatable together with the output shaft of the motor.

An intermediate portion of the first sun shaft 11 in the axial direction is supported by the rolling bearing 6 mounted to the mounting hole 42a such that the first sun shaft 11 is rotatable about an axis C of the first sun shaft 11. The rolling bearing 6 is a ball bearing including an outer ring 6a, an inner ring 6b, and a plurality of balls (rolling elements) 6c. The outer ring 6a is press-fitted to and fixed to an inner surface of the mounting hole 42a. The inner ring 6b is press-fitted to and fixed to the outer peripheral surface of the first sun shaft 11. The balls 6c are arranged between the outer ring 6a and the inner ring 6b so as to be rollable.

The first fixed ring 12 has an annular body, and is disposed radially outward of the first sun shaft 11 so as to be concentric with the axis C of the first sun shaft 11. The outer peripheral surface of the first fixed ring 12 is press-fitted to the large-diameter surface 41b of the housing body 41, so that the first fixed ring 12 is fixed to the housing body 41. The large-diameter surface 41b is located at an inner periphery of the housing body 41.

The first planetary rollers 13 each have a cylindrical shape, and are disposed between the first sun shaft 11 and the first fixed ring 12. The first planetary rollers 13 are arranged at equal intervals in the circumferential direction of the first fixed ring 12. An axial width of the first planetary rollers 13 is slightly smaller than the axial width of the first fixed ring 12.

The first planetary rollers 13 are in rolling contact with a part of the outer peripheral surface of the first sun shaft 11 and an inner peripheral surface 12b of the first fixed ring 12. The part of the outer peripheral surface of the first sun shaft 11 is located on the first axial side. The diameter of the first planetary rollers 13 is slightly larger than the radial dimension between the outer periphery of the first sun shaft 11 and the inner periphery of the first fixed ring 12. Thus, the first planetary rollers 13 are fitted between the first sun shaft 11 and the first fixed ring 12 with a negative clearance (hereinafter referred to as "first negative clearance"). That is, the first planetary rollers 13 are fitted between the first sun shaft 11 and the first fixed ring 12 such that the first negative clearance is provided. Thus, the first planetary rollers 13 are in contact with the first sun shaft 11 and the first fixed ring 12 with a predetermined pressing force.

Traction oil is applied to contact surfaces of the first sun shaft 11 and the first planetary rollers 13 and contact surfaces of the first planetary rollers 13 and the first fixed ring 12. When the first sun shaft 11 rotates, rotational power is transmitted to the first planetary rollers 13 by a shearing force of the traction oil, and the first planetary rollers 13 revolve on the inner peripheral surface 12b of the first fixed ring 12.

The first carrier 14 has an annular body. The first carrier 14 is disposed on the first axial side relative to the first planetary rollers 13 (i.e., the first carrier 14 is disposed closer to the first axial side than the first planetary rollers 13 are) such that an outer peripheral surface of the first carrier 14 faces the large-diameter surface 41b of the housing 4. A plurality of holes 14a is provided on an outer peripheral side of the first carrier 14 (see FIG. 2), and an end of each of first support shafts 15 on the first axial side is press-fitted into the corresponding one of the holes 14a and fixed thereto.

Each of the first support shafts 15 has a columnar shape, and an end of each of the first support shafts 15 on the second axial side is inserted into an inner periphery of the corresponding one of the first planetary rollers 13 so as to be in sliding contact with the inner peripheral surface of the corresponding one of the first planetary rollers 13. Thus, a small gap allowing sliding is provided between the outer peripheral surface of each of the first support shafts 15 and the inner peripheral surface of the corresponding one of the first planetary rollers 13. Thus, the first planetary rollers 13 are supported by the first support shafts 15 so as to be rotatable and axially movable with respect to the first support shafts 15.

Annular rib rings 8A, 8B are respectively disposed on both axial sides of the first fixed ring 12. The rib ring 8A is sandwiched between the first fixed ring 12 and the lid 42. The rib ring 8B is sandwiched between the first fixed ring 12 and a spacer 3 having an annular shape. The outer diameter of each of the rib rings 8A, 8B is the same as or slightly smaller than the large-diameter surface 41b of the housing body 41. The inner diameter of each of the rib rings 8A, 8B is smaller than the inner diameter of the first fixed ring 12, and the radial inner ends of the rib rings 8A, 8B protrude radially inward from the inner peripheral surface 12b of the first fixed ring 12. As described above, the first planetary rollers 13 that roll on the inner peripheral surface 12b of the first fixed ring 12 are axially movable with respect to the first support shafts 15, but the movements of the first planetary rollers 13 toward the both sides in the axial direction are restricted by the rib rings 8A, 8B.

The configuration of the second-stage power transmission mechanism will be described. The second-stage power transmission mechanism 20 functions as a low-speed power transmission mechanism. Similarly to the first-stage power transmission mechanism 10, the second-stage power transmission mechanism 20 includes a second sun shaft 21, a second fixed ring 22, a plurality of second planetary rollers 23, and a second carrier 24. The second sun shaft 21 has a columnar shape. The second sun shaft 21 is disposed on the first axial side relative to the first sun shaft 11 (i.e., the second sun shaft 21 is disposed closer to the first axial side than the first sun shaft 11 is) so as to be concentric with the axis C of the first sun shaft 11. The outer diameter of the second sun shaft 21 is the same as the outer diameter of the first sun shaft 11. The end of the second sun shaft 21 on the second axial side is press-fitted to the inner periphery of the first carrier 14 and fixed thereto. Thus, the second sun shaft 21 rotates about the axis C together with the first carrier 14 in conjunction with revolution of the first planetary rollers 13.

An end surface of the second sun shaft 21 on the second axial side is provided with a conical center hole 21a. A ball 31 is disposed between the center hole 21a of the second sun shaft 21 and an end surface of the first sun shaft 11 on the first axial side. The ball 31 is in line contact with an inner surface of the center hole 21a and is in point contact with the end surface of the first sun shaft 11 on the first axial side. This restrains the end surfaces of the first sun shaft 11 and the second sun shaft 21 from being in surface contact with each other, thereby reducing the frictional resistance between the end surfaces.

The second fixed ring 22 has an annular body, and is disposed radially outward of an end of the second sun shaft 21 on the first axial side so as to be concentric with the axis C of the second sun shaft 21. An outer peripheral surface of the second fixed ring 22 is press-fitted to the large-diameter surface 41b of the housing body 41, so that the second fixed ring 22 is fixed to the housing body 41. The large-diameter surface 41b is located at an inner periphery of the housing body 41. The second fixed ring 22 is the same member as the first fixed ring 12. In other words, the second fixed ring 22 has the same structure as the structure of the first fixed ring 12. The inner diameter of the second fixed ring 22 is the same as the inner diameter of the first fixed ring 12.

Each of the second planetary rollers 23 has a cylindrical shape, and is disposed between the second sun shaft 21 and the second fixed ring 22. The second planetary rollers 23 are arranged at equal intervals in the circumferential direction of the second fixed ring 22. The axial width of the second planetary rollers 23 is slightly smaller than the axial width of the second fixed ring 22. Each of the second planetary rollers 23 is the same member as each of the first planetary rollers 13. In other words, each of the second planetary rollers 23 has the same structure as the structure of each of the first planetary rollers 13. The outer diameter of the second planetary rollers 23 is the same as the outer diameter of the first planetary rollers 13.

The second planetary rollers 23 are in rolling contact with a part of an outer peripheral surface of the second sun shaft 21 and an inner peripheral surface 22b of the second fixed ring 22. The part of the outer peripheral surface of the second sun shaft 21 is located on the first axial side. The diameter of the second planetary rollers 23 is slightly larger than the radial dimension between an outer periphery of the second sun shaft 21 and an inner periphery of the second fixed ring 22. Thus, the second planetary rollers 23 are fitted between the second sun shaft 21 and the second fixed ring 22 with a negative clearance (hereinafter referred to as "second negative clearance"). That is, the second planetary rollers 23 are fitted between the second sun shaft 21 and the second fixed ring 22 such that the second negative clearance is provided. Thus, the second planetary rollers 23 are in contact with the second sun shaft 21 and the second fixed ring 22 with a predetermined pressing force.

Traction oil is applied to contact surfaces of the second sun shaft 21 and the second planetary rollers 23 and contact surfaces of the second planetary rollers 23 and the second fixed ring 22. When the second sun shaft 21 rotates, rotational power is transmitted to the second planetary rollers 23 by the shearing force of the traction oil, and the second planetary rollers 23 revolve on the inner peripheral surface 22b of the second fixed ring 22.

The second carrier 24 has an annular body. The second carrier 24 is disposed on the first axial side relative to the second planetary rollers 23 (i.e., the second carrier 24 is disposed closer to the first axial side than the second planetary rollers 23 are) such that an outer peripheral surface of the second carrier 24 faces the small-diameter surface 41c of the housing 4. A plurality of holes 24a are provided on an outer peripheral side of the second carrier 24, and an end of each of second support shafts 25 on the first axial side is press-fitted into the corresponding one of the holes 24a and fixed thereto.

Each of the second support shafts 25 is the same member as each of the first support shafts 15. In other words, each of the second support shafts 25 has the same structure as the structure of each of the first support shafts 15. Each of the second support shafts 25 has a columnar shape, and the end of each of the second support shafts 25 on the second axial side is inserted into an inner periphery of the corresponding one of the second planetary rollers 23 so as to be in sliding contact with the inner peripheral surface of the corresponding one of the second planetary rollers 23. Thus, a small gap allowing sliding is provided between the outer peripheral surface of each of the second support shafts 25 and the inner peripheral surface of the corresponding one of the second planetary rollers 23. Thus, the second planetary rollers 23 are supported by the second support shafts 25 so as to be rotatable and axially movable with respect to the second support shafts 25.

The power transmission shaft 5 has a columnar shape, and is inserted into the mounting hole 41a of the housing body 41. The power transmission shaft 5 is disposed on the first axial side relative to the second sun shaft 21 (i.e., the power transmission shaft 5 is disposed closer to the first axial side than the second sun shaft 21 is) so as to be concentric with the axis C of the second sun shaft 21, and the end of the power transmission shaft 5 on the second axial side is press-fitted to and fixed to the inner periphery of the second carrier 24. The power transmission shaft 5 serves as an output shaft that outputs, to the outside, rotational power input to the first sun shaft 11, after the speed of the rotation input to the first sun shaft 11 is reduced.

An intermediate portion of the power transmission shaft 5 in the axial direction is supported by the rolling bearing 7 mounted to the mounting hole 41a such that the power transmission shaft 5 is rotatable. The rolling bearing 7 is a ball bearing including an outer ring 7a, inner ring 7b, and a plurality of balls (rolling elements) 7c. The outer ring 7a is press-fitted to and fixed to an inner surface of the mounting hole 41a. The inner ring 7b is press-fitted to and fixed to the outer peripheral surface of the power transmission shaft 5. The balls 7c are arranged between the outer ring 7a and the inner ring 7b so as to be rollable. Thus, the second carrier 24 is supported by the housing 4 via the power transmission shaft 5 and the rolling bearing 6 so as to be rotatable. Thus, the power transmission shaft 5 rotates about the axis C together with the second carrier 24 in conjunction with revolution of the second planetary rollers 23.

An end surface of the power transmission shaft 5 on the second axial side is provided with a conical center hole 5a. A ball 32 is disposed between the center hole 5a of the power transmission shaft 5 and the end surface of the second sun shaft 21 on the first axial side. The ball 32 is in line contact with an inner surface of the center hole 5a and is in point contact with the end surface of the second sun shaft 21 on the first axial side. This restrains the end surfaces of the power transmission shaft 5 and the second sun shaft 21 from being in surface contact with each other, thereby reducing the frictional resistance between the end surfaces.

Annular rib rings 9A, 9B are respectively disposed on both axial sides of the second fixed ring 22. The rib ring 9A is sandwiched between the second fixed ring 22 and the spacer 3. The rib ring 9B is sandwiched between the second fixed ring 22 and the step surface 41d of the housing body 41. The outer diameter of each of the rib rings 9A, 9B is the same as or slightly smaller than the large-diameter surface 41b of the housing body 41. The inner diameter of each of the rib rings 9A, 9B is smaller than the inner diameter of the second fixed ring 22, and the radial inner ends of the rib rings 9A, 9B protrude radially inward from the inner peripheral surface 22b of the second fixed ring 22. As described above, the second planetary rollers 23 that roll on the inner peripheral surface 22b of the second fixed ring 22 are axially movable with respect to the second support shafts 25, but the movements of the second planetary rollers 23 toward both sides in the axial direction are restricted by the rib rings 9A, 9B.

Transmission of power will be described. In the first-stage power transmission mechanism 10, the rotational power of the first sun shaft 11 serving as the input shaft is transmitted to the first planetary rollers 13 by the shearing force of the traction oil. The first planetary rollers 13 rotate about the first support shafts 15 and revolve around the first sun shaft 11 while rolling on the inner peripheral surface 12b of the first fixed ring 12. The first carrier 14 thus rotates about the axis C together with the second sun shaft 21. Accordingly, the rotational power of the first sun shaft 11 of the first-stage power transmission mechanism 10 is transmitted to the second sun shaft 21 of the second-stage power transmission mechanism 20 with reduced rotation speed. Therefore, the second sun shaft 21 rotates at a lower speed than the speed at which the first sun shaft 11 rotates.

In the second-stage power transmission mechanism 20, the rotational power of the second sun shaft 21 is transmitted to the second planetary rollers 23 by the shearing force of the traction oil. The second planetary rollers 23 rotate about the second support shafts 25 and revolve around the second sun shaft 21 while rolling on the inner peripheral surface 22b of the second fixed ring 22. The second carrier 24 thus rotates about the axis C together with the power transmission shaft 5. Accordingly, the rotational power of the second sun shaft 21 of the second-stage power transmission mechanism 20 is transmitted to the power transmission shaft 5 with further reduced rotation speed.

Figure 2:
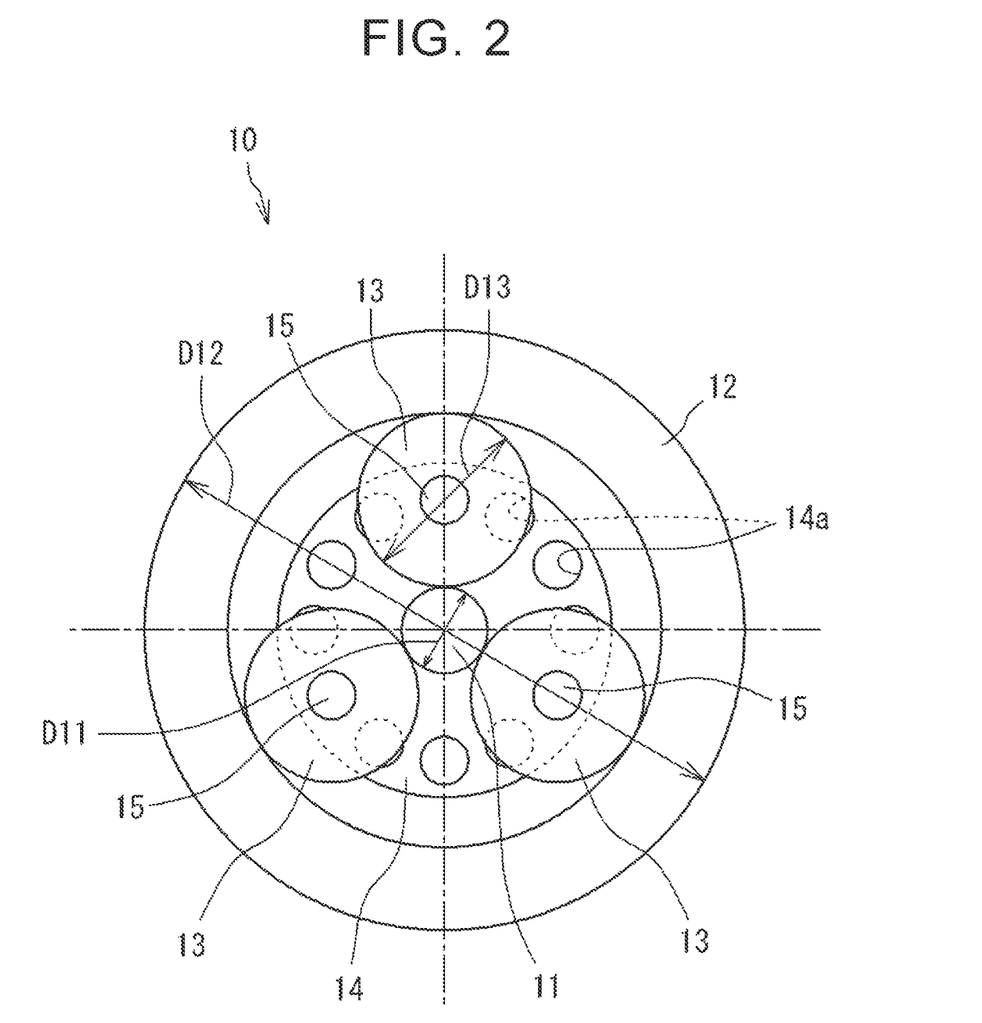
FIG. 2 is a front view of a first-stage power transmission mechanism as viewed from a second axial side.
Figure 3:
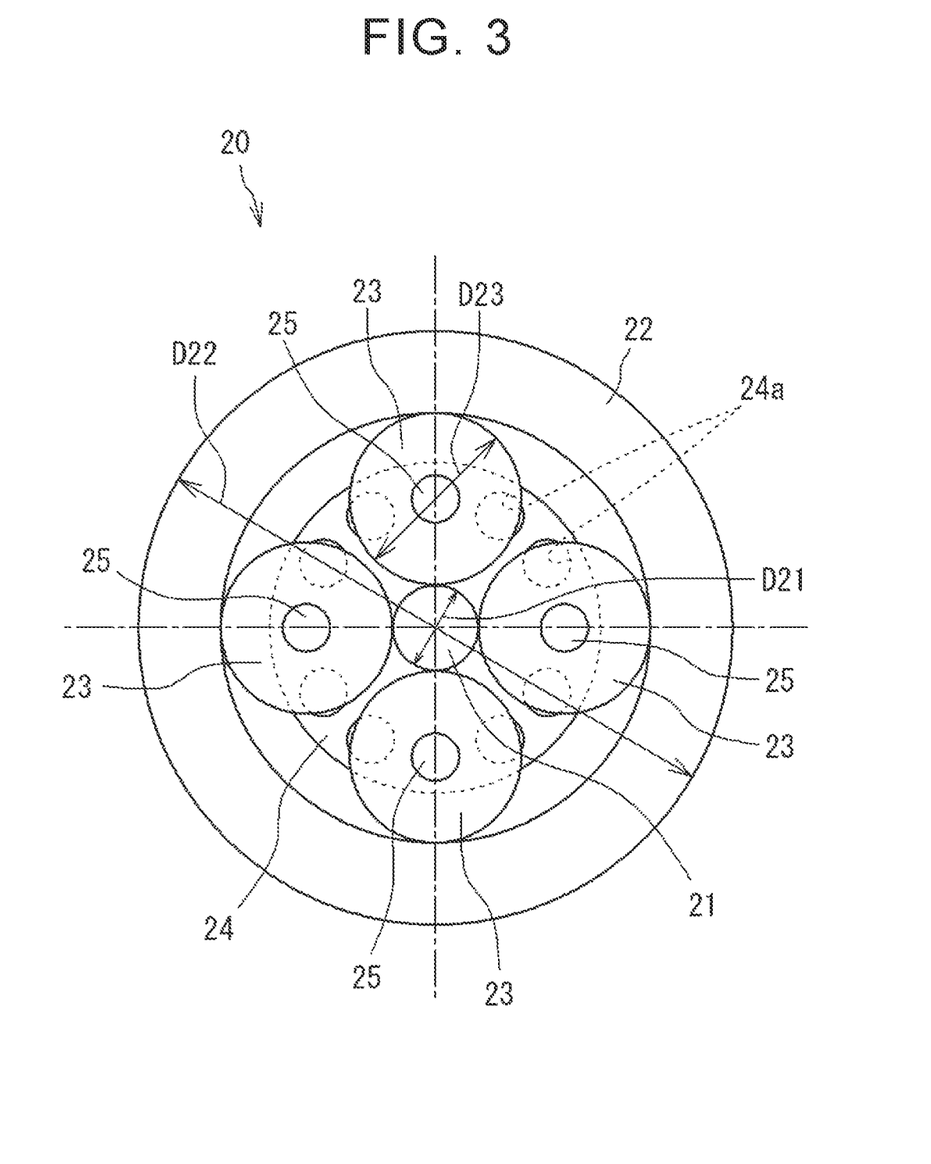
FIG. 3 is a front view of a second-stage power transmission mechanism as viewed from the second axial side.

Comparison between the first-stage power transmission mechanism and the second-stage power transmission mechanism will be described. FIG. 2 is a front view of the first-stage power transmission mechanism 10 as viewed from the second axial side. FIG. 3 is a front view of the second-stage power transmission mechanism 20 as viewed from the second axial side. In FIG. 2, a clearance amount S1 of the first negative clearance in the first-stage power transmission mechanism 10 is represented by the following equation (1) including an outer diameter D11 of the first sun shaft 11, an inner diameter D12 of the first fixed ring 12, and an outer diameter D13 of each of the first planetary rollers 13.

$$S1 = D11 + D13 \times 2 - D12 \quad (1)$$

Similarly, in FIG. 3, a clearance amount S2 of the second negative clearance in the second-stage power transmission mechanism 20 is represented by the following equation (2) including an outer diameter D21 of the second sun shaft 21, an inner diameter D22 of the second fixed ring 22, and an outer diameter D23 of each of the second planetary rollers 23.

$$S2 = D21 + D23 \times 2 - D22 \quad (2)$$

In the present embodiment, as described above, the outer diameter D11 and the outer diameter D21 are the same, the outer diameter D13 and the outer diameter D23 are the same, and the inner diameter D12 and the inner diameter D22 are the same. Thus, according to the above equations (1) and (2), the clearance amount S1 of the first negative clearance and the clearance amount S2 of the second negative clearance are set to be equal to each other.

The number of the first planetary rollers 13 of the first-stage power transmission mechanism 10 is smaller than the number of the second planetary rollers 23 of the second-stage power transmission mechanism 20. Accordingly, the number of the first support shafts 15 supporting the first planetary rollers 13 is smaller than the number of the second support shafts 25 supporting the second planetary rollers 23. For example, in the present embodiment, the number of the first planetary rollers 13 and the number of the first support shafts 15 are both three, and the number of the second planetary rollers 23 and the number of the second support shafts 25 are both four.

In the present embodiment, the first carrier 14 of the first-stage power transmission mechanism 10 and the second carrier 24 of the second-stage power transmission mechanism 20 are identical members (i.e., the same members) such that the identical members can be used as the first carrier 14 of the first-stage power transmission mechanism 10 and the second carrier 24 of the second-stage power transmission mechanism 20. Specifically, the first carrier 14 is provided with the 12 holes 14a arranged at equal intervals in the circumferential direction such that the three first support shafts 15 arranged at equal intervals (at intervals of 120°) in the circumferential direction can be press-fitted into the first carrier 14, and the four second support shafts 25 arranged at equal intervals (at intervals of 90°) in the circumferential direction can be press-fitted into the first carrier 14.

Similarly, the second carrier 24 is provided with the 12 holes 24a arranged at equal intervals (at intervals of 30°) in the circumferential direction such that the four second support shafts 25 arranged at equal intervals in the circumferential direction can be press-fitted into the second carrier 24, and the three first support shafts 15 arranged at equal intervals in the circumferential direction can be press-fitted into the second carrier 24. Thus, in the present embodiment, each of the first carrier 14 and the second carrier 24 is provided with the same number of (12) holes 14a or 24a.

In the multi-stage planetary roller power transmission device 1 of the present embodiment, the clearance amount S1 of the first negative clearance is equal to the clearance amount S2 of the second negative clearance. Thus, the same components (i.e., the identical components) can be used as the first fixed ring 12 of the first-stage power transmission mechanism 10 and the second fixed ring 22 of the second-stage power transmission mechanism 20, and the same components can be used as the first planetary rollers 13 of the first-stage power transmission mechanism 10 and the second planetary rollers 23 of the second-stage power transmission mechanism 20. Thus, it is possible to restrain an increase in the number of kinds of components. Further, the clearance amounts S1, S2 are equal to each other and the number of the first planetary rollers 13 is smaller than the number of the second planetary rollers 23. Thus, the pressing force of the first planetary rollers 13 against the first sun shaft 11 that rotates at a high speed and the first fixed ring 12 is smaller than the pressing force of the second planetary rollers 23 against the second sun shaft 21 that rotates at a low speed and the second fixed ring 22. Accordingly, the life of the first-stage power transmission mechanism 10 functioning as the high-speed power transmission mechanism can be increased, so that the life of the entire device can be increased.

Since the number of the first planetary rollers 13 is smaller than the number of the second planetary rollers 23, the number of the first support shafts 15 is also smaller than the number of the second support shafts 25. In the present embodiment, the first carrier 14 and the second carrier 24 are identical members (i.e., the same members), and each of the identical members is provided with the holes 14a or 24a into which the different numbers of the first support shafts 15 and the second support shafts 25 can be press-fitted. The first support shafts 15 are arranged at equal intervals in the circumferential direction, and the second support shafts 25 are arranged at equal intervals in the circumferential direction. Thus, even when the number of the first support shafts 15 is smaller than the number of the second support shafts 25, the identical members (i.e., same members) can be used as the first carrier 14 and the second carrier 24, and thus an increase in the number of kinds of the components can be further restrained.

The embodiment disclosed above is illustrative in all respects and not restrictive. That is, the multi-stage planetary roller power transmission device of the disclosure is not limited to the illustrated embodiment, and may be implemented in other modes within the scope of the disclosure. For example, in the above-described embodiment, the first sun shaft 11 serves as an input shaft, and the power transmission shaft 5 serves as an output shaft. However, the disclosure is not limited to this configuration, and the power transmission shaft 5 may serve as the input shaft, and the first sun shaft 11 may serve as the output shaft. In this case, since the second sun shaft 21 rotates at a higher speed than a speed at which the first sun shaft 11 rotates, the second-stage power transmission mechanism 20 functions as the high-speed power transmission mechanism, and the first-stage power transmission mechanism 10 functions as the low-speed power transmission mechanism.

In the above-described embodiment, the first carrier 14 and the second carrier 24 are identical members (i.e., the same members). Alternatively, the first carrier 14 and the second carrier 24 may be different members. In this case, the same number (three in the above-described embodiment) of holes 14a as the number of the first support shafts 15 may be provided in the first carrier 14 at equal intervals in the circumferential direction, and the same number (four in the above-described embodiment) of holes 24a as the number of the second support shafts 25 may be provided in the second carrier 24 at equal intervals in the circumferential direction. The multi-stage planetary roller power transmission device of the disclosure is not limited to the two-stage planetary roller power transmission device, and may be a planetary roller power transmission device with three or more stages.

What is claimed is:

1. A multi-stage planetary roller power transmission device comprising:

a high-speed power transmission mechanism including a first sun shaft rotatable about an axis thereof, a first fixed ring disposed radially outward of the first sun shaft so as to be concentric with the first sun shaft, a plurality of first planetary rollers disposed between the first sun shaft and the first fixed ring with a first negative clearance, a plurality of first support shafts configured to respectively support the first planetary rollers such that the first planetary rollers are rotatable, and a first carrier into which the first support shafts are press-fitted, the first carrier being configured to rotate in conjunction with revolution of the first planetary rollers, and the first carrier having an annular shape; and a low-speed power transmission mechanism including a second sun shaft rotatable about an axis thereof at a lower speed than a speed at which the first sun shaft rotates, a second fixed ring disposed radially outward of the second sun shaft so as to be concentric with the second sun shaft, a plurality of second planetary rollers disposed between the second sun shaft and the second fixed ring with a second negative clearance, a plurality of second support shafts configured to respectively support the second planetary rollers such that the second planetary rollers are rotatable, and a second carrier into which the second support shafts are press-fitted, the second carrier being configured to rotate in conjunction with revolution of the second planetary rollers, and the second carrier having an annular shape, wherein a clearance amount of the first negative clearance and a clearance amount of the second negative clearance are equal to each other, and the number of the first planetary rollers is smaller than the number of the second planetary rollers.

2. The multi-stage planetary roller power transmission device according to claim 1, wherein:

the first carrier and the second carrier are identical members; and each of the identical members has a plurality of holes into which the first support shafts arranged at equal intervals in a circumferential direction are allowed to be press-fitted, and into which the second support shafts arranged at equal intervals in the circumferential direction are allowed to be press-fitted.

* * * * *